Aug. 25, 1953
M. E. McCLELLAN
BALE OR BUNDLE HANDLING MEANS FOR
BALING PRESSES OR THE LIKE
Filed May 3, 1948
2,649,945
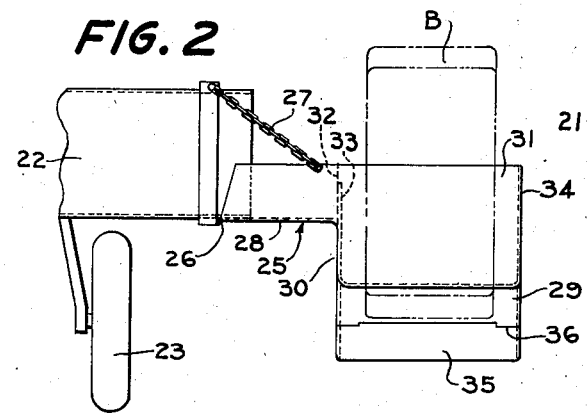
FIG. 2    FIG. 1
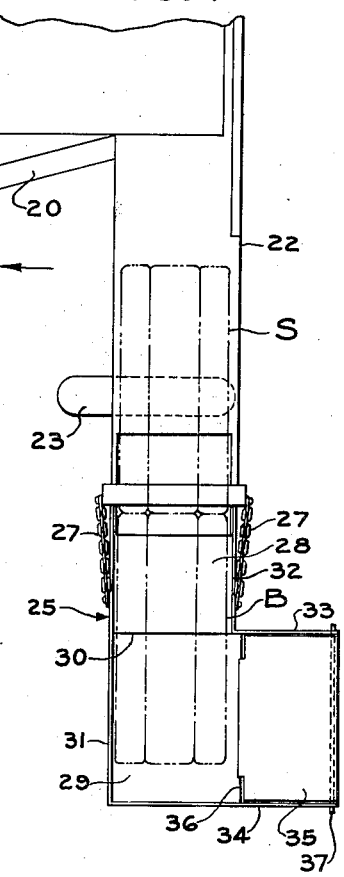
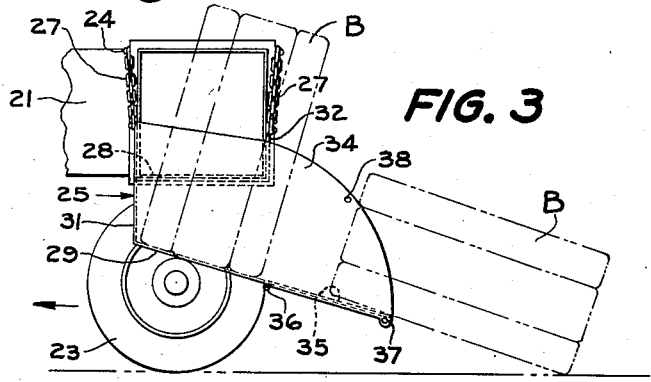
FIG. 3
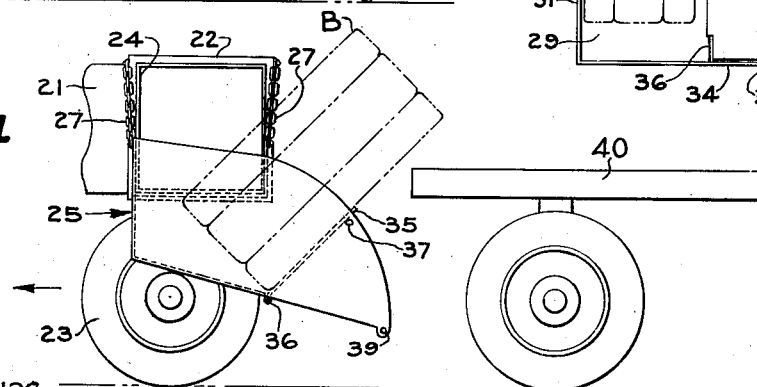
FIG. 4
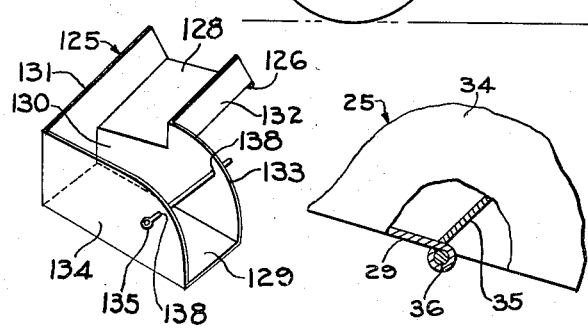
FIG. 6    FIG. 5
INVENTOR.
MARCUS E. McCLELLAN
ATTORNEYS Patented Aug. 25, 1953

2,649,945

UNITED STATES PATENT OFFICE 2,649,945

BALE OR BUNDLE HANDLING MEANS FOR
BALING PRESSES OR THE LIKE

Marcus E. McClellan, Ottumwa, Iowa, assignor to
Deere Manufacturing Co., Dubuque, Iowa, a
corporation of Iowa Application May 3, 1948, Serial No. 24,745

13 Claims. (Cl. 193—5)

1

This invention relates to means for controlling the discharge and delivery of articles, such as bales, bundles or the like. More particularly, the invention relates to a bale case extension unit for use with baling presses, preferably baling presses of the mobile type.

In the conventional mobile baling press, bales are formed in a horizontal bale case or chamber and are discharged from the chamber by pressure created by succeeding bales, the discharged bale falling by its own weight to the ground to be subsequently picked up or, in some cases, being delivered to special handling means for loading the bales on an associated vehicle. In either event, it is desirable that the bales be discharged in some semblance of order so that they lend themselves to expeditious handling and loading. In some types of mobile baling presses, the baling chamber parallels the direction of travel and the bale is discharged therefrom with its major axis likewise generally parallel to the line of travel. In another type of mobile baler, the bale case is transverse to the line of travel, and the bale is discharged therefrom with its major axis likewise transverse to the direction of travel. In both instances, the major axis of the bale is horizontal. In either case, when the bales are discharged to the ground to be manually picked up subsequently, the disposition of the bales lengthwise facilitates handling. However, if it is desired to immediately load the bales on some sort of vehicle or mechanical device closely associated with the baler, it is often more desirable to have the bales discharged with their major axis vertical.

According to the present invention, there is provided a unit for attachment to a bale case. One of the features of this unit is that it will receive a bale that is discharged with its major axis horizontal and transverse to the line of travel and turn it so that its major axis is parallel to the line of travel to discharge the bale to the ground to be manually picked up subsequently. Another feature of this unit is that it may also be used to turn the bale so that its major axis is substantially upright, the unit thus positioning the bale for easy handling and transferring to a vehicle or similar means associated with the baling press. It is an important feature of the invention to provide the unit with a series of offset portions for accomplishing turning of the bale and still further to provide for the adjustable displacement of one of these portions to serve as means for retaining the bale in a selected position. Broadly, it is an object

2 of the invention to provide a bale receiving unit that is capable of discharging a bale in either of two directions or positions.

Still another object of the invention is to provide a low-cost attachment unit that may be readily used on balers of existing types. Still further, it is an object to provide a bale case extension that is foldable with respect to the bale case so that the over-all width or length of the baler may be reduced to facilitate transporting of the baler.

The foregoing and other important objects and desirable features inherent in and encompassed by the invention will become apparent from the following detailed description of two preferred forms of the invention as illustrated in the accompanying sheet of drawings, in which Figure 1 is a plan view of a rear and side portion of a baler of the type having its bale case disposed transverse of the line of travel;

Figure 2 is a fragmentary front view of the structure shown in Figure 1;

Figure 3 is an end elevational view of the structure of Figures 1 and 2;

Figure 4 is a view similar to that shown in Figure 3 but illustrating a second position of one of the portions of the bale case extension unit operative to hold a bale in a generally upright position;

Figure 5 is an enlarged fragmentary view, partly in section, showing the hinging of the delivery portion of the unit; and Figure 6 is a perspective view of a modified form of the invention, showing a different type of means for restraining the bale and holding the bale in a position such as that indicated in Figure 4.

Although the invention is illustrated as primarily adapted to a baler of the type in which the bale case is disposed transverse to the line of travel, various fundamental aspects of the invention are applicable to balers of all types.

Further, the invention is not limited in its specific aspects to the handling of bales but will also find use in the handling of other material or articles prepared in bale or bundle form.

The baler illustrated in Figure 1 is of the pickup type having a main frame including a draft tongue 20, longitudinally extending pickup structure 21, and a laterally or transversely extending bale or chamber 22. The baler is supported on a plurality of ground wheels, one of which is indicated in the drawings at 23. The baler is adapted to be propelled over the ground by a tractor or other vehicle and the direction of travel is indicated by the arrows in Figures 1, 3 and 4. The manner of propelling the baler is, of course, of no importance in the present case, and so far as certain aspects of the invention are concerned, the baler could be self-propelled or stationary.

The left hand end of the bale case 22 is open at 24 to provide discharge means for discharging bales in succession, a result that is accomplished by the forming of one bale after the other in the bale case 22 and moving of the bales to the left by pressure created by the following bales. In Figure 1, an outermost bale about to be completely discharged is indicated at B and a succeeding bale is indicated at S.

The bale case unit is in the form of an extension or attachment, designated generally by the numeral 25, pivoted on a horizontal axis at 26 to the left hand end of the bale case 22 adjacent to or in association with the discharge means provided by the open end 24. Means in the form of a pair of chains 27 serves to carry the unit 25 in operating position. It will be seen that the entire unit may be folded about the hinge or pivot axis 26 to minimize the over-all width of the baler.

The bale case extension or unit 25 is preferably constructed of sheet metal to form the structure illustrated. This structure includes a first rectangular plate-like element or portion 28 which is substantially flat and is horizontal in operating position to provide a receiving means which operates substantially as an extension of the floor of the bale case 22. The unit includes a second portion 29 which is offset or set down from the portion 28 and is integrally joined thereto by a vertical wall portion 30, the junction of which with the floor extension 28 forms an outer terminal edge on said floor extension which serves as a fulcrum to effect tipping of a bale downwardly from a horizontal position to an upright position, as will be explained below. As best seen in Figures 3 and 4, the portion 29 inclines downwardly and rearwardly and, being therefore angularly related to the portion 28, provides means for causing the bales to tip rearwardly, as will be seen below. The structure is provided with an appropriate wall or side member 31 at its front end. A short rear wall or side member 32 extends vertically upwardly from the rear edge of the horizontal portion 28 and terminates at its outer end in a vertical rearwardly extending wall 33. This wall is relatively short compared to a parallel longer end wall 34 that is disposed vertically and extends longitudinally alongside the outermost edge of the portion 29. The forward portion of the wall 34 joins the front wall 31. The two walls 33 and 34 are preferably curved at their rear end portions as illustrated. The terminal edge or fulcrum at 28—30, the front wall 31 and end wall 34 comprise members providing a bale-drop-off zone into which bales are tipped from horizontal to upright positions. The spacing between the walls 30 and 34 is substantially equal to the height or vertical dimension of a bale emerging horizontally from the discharge opening.

The unit includes a further portion providing bale-delivery means in the form of a plate 35 hinged at 36 to the transverse rear edge of the portion 29. In the position of the plate 35 shown in Figure 3, the plate forms substantially a continuation of the portion 29 and both portions lie in a plane that is inclined downwardly and rearwardly from the forward edge of the portion 29. The plate or delivery portion 35 may be maintained in the position shown in Figure 3 by resting on any suitable device such as a removable pin 37 positioned across the space between the lower rear corners of the walls 33 and 34 (Figure 1). The plate portion 35 is capable of positioning as shown in Figure 4, wherein it is swung upwardly about the hinge 36 and is retained in an upwardly and rearwardly directed position by means of the pin 37 which cooperates with, for example, an opening 38 (Figure 3) in the outer side wall 34 and an alined opening in the wall 33. Figure 4 shows the lower opening, as at 39, which receives the pin 37 when the plate 35 is in the position of Figure 3. There is also illustrated in Figure 4 a vehicle such as a flat bed trailer 40 which may be towed behind the baler and onto which may be loaded bales discharged from the baler.

As previously stated, the bales are formed in the baling chamber 22 and are moved outwardly, or to the left hand side of the baler, for discharge through the discharge means formed by the opening 24. The position of the bale B just prior to discharge is illustrated in Figure 1. It will be noted that the major axis or length of the bale B is horizontal and transverse to the line of travel of the baler. In Figure 2, the bale B is shown as having been moved sufficiently far out on the receiving portion 28 to turn or tumble over into the drop-off zone and onto the lower portion 29, whereupon the major axis of the bale is substantially upright. The bale is prevented from tipping further outwardly by the means compressing the wall 34. Because of the end means or wall 34, the bale cannot tip end over end further outwardly than the drop-off zone, nor can it tip forwardly, on account of the front wall 31; and because of the inclination of the plane in which the portions 29 and 35 lie (Figure 3) the bale will turn generally about its minor axis and will fall rearwardly to be delivered by the portion 35 to the ground. The impetus given to the bale by dropping thereof from the portion 28 to the portion 29 and the further impetus given to the bale by forward travel of the baler will easily result in tipping or turning of the bale to the position shown in Figure 3, whereupon the rearwardmost and lower corner of the bale engages the ground; and continued forward travel of the baler will result in a complete delivery of the bale to the ground.

The foregoing covers the procedure that can be accomplished by use of the bale case extension unit 25 in instances where it is desired to drop the bales to the ground so that they can be subsequently picked up manually. It will be noted that the bales are delivered to the ground with their major axes parallel to the line of travel, the bales having been turned from their original positions in the bale case to their final positions by means of the cooperating portions of the unit 25. Inasmuch as the portions 28, 29 and 35 are in descending order and rearwardly, the bale is easily delivered in the manner aforesaid, all without the use of complicated moving parts.

In the use of the baler as illustrated in Figure 4, wherein the trailer 40, or similar means, is associated with the baler to receive the discharged bales, the delivery plate 35 may be moved to the position in which it is held by insertion of the pin 37 into the upper hole 38. The plate member 35 thus becomes a barrier or obstruction to engage the bale and restrain the bale against complete tipping, whereupon the bale is held in the rearwardly inclined position shown. This position may be considered an upright position compared to the horizontal position assumed by the bale when discharged directly to the ground. Since the bale is in the rearwardly inclined upright position shown, a man standing on the platform of the trailer 40 may easily lift the bale to the platform. The delivery plate 35 thus has the dual function illustrated in Figures 3 and 4 and accomplishes this function by being displaceable with respect to the portion 29.

In the modified form of the invention shown in Figure 6, the various components are substantially identical with the exception of means for arresting complete tipping of the bale so that the result in Figure 4 may be accomplished. The modified form of bale case extension unit is designated generally by the numeral 125 and has portions and walls corresponding to the portions and walls of the unit 25, with the exception of a portion to be referred to below. These portions in the unit 125 are designated by the numerals 128, 129, 130, 131, 132, 133, and 134. The unit 125 is shown as including means for accomplishing a hinge connection, as at 126, with the bale case 22. In place of the displaceable portion or section 25, the inclined portion 129 of the bale case unit 125 is substantially coextensive with the walls 133 and 134. The means for accomplishing restraining of the bale in place of the displaceable portion 35 is here accomplished by a removable pin 135 receivable by a pair of aligned apertures 138 in the walls 133 and 134. When it is desired to use the extension unit 125 to accomplish the result indicated in Figure 3, the pin 135 will be removed so that the bales may be discharged directly to the ground. When the bale case extension unit 125 is used in place of the unit 25 as in Figure 4, the member or pin 135 will be positioned as illustrated in Figure 6 to accomplish the same results as are accomplished by the plate 35. When not in use, the pin 135 may be carried in any convenient place on the baler; or the situation may be such that the operator of the baler may utilize any convenient rod or member at hand.

It will be seen from the foregoing that the two forms of the invention illustrated are admirably suited for acomplishing the efficient handling of bales, so that the bales may be delivered directly to the ground or may be conditioned for handling in other manners, the delivery portion of either unit being convertible to deliver bales in either of at least two directions or positions. It will be understood, of course, that the basic concept of the invention is, as stated above, applicable to the handling of other articles. It is not, therefore, desired to limit the invention by the precise details illustrated and described, for numerous modifications and alterations may be made in the preferred forms of the invention without departing from the spirit and scope of the invention as defined in the appended claims.

I claim:

1. In a baler of the type adapted to travel over the ground and having a bale case for discharging bales in a manner in which the major axis of each bale is generally horizontal and transverse to the line of travel, the improvement comprising: a bale case extension associated with the bale case and having a first portion for receiving a bale in the manner aforesaid and a second related portion offset from the first portion to turn the bale so that its major axis is substantially upright; a third portion adjacent the second portion and angularly related thereto to tip the bale to a position in which its major axis inclines upwardly and longitudinally from the horizontal; and means on said bale case extension for retaining the bale in said last named position.

2. The invention defined in claim 1, further characterized in that: said retaining means is mounted for movement to a non-retaining position to provide for continued tipping of the bale so that the bale may drop to the ground with its major axis generally parallel to the line of travel.

3. The invention defined in claim 2, further characterized in that: said retaining means in its non-retaining means forms an extension of said third portion to guide the bale to the ground.

4. In a machine having means for discharging articles such as bales with the major axis of each bale generally horizontal, the improvement comprising: means for receiving a bale and effecting turning thereof so that its major axis is generally upright; means connected to the receiving means, for tipping the bale; and means movable with respect to said tipping means between a position providing for complete tipping of the bale and a position arresting tipping of the bale to hold the bale in a position with its major axis inclined upwardly.

5. In a machine having means for discharging articles such as bales, the improvement comprising: a bale-handling unit having a receiving portion adjacent the discharge means, a second portion stepped below the receiving portion, and a delivery portion, said second and delivery portions being arranged in descending order to provide a chute-like arrangement effective to turn a bale end-over-end from the receiving portion to the second portion, one of said portions being displaceable with respect to at least one of the others to prevent such turning of a bale.

6. In a machine having means for discharging articles such as bales, the improvement comprising: a bale-handling unit having a receiving portion adjacent the discharge means, a second portion stepped below the receiving portion, and a delivery portion, said portions being arranged in descending order to provide a chute-like arrangement effective to turn a bale end-over-end from the receiving portion to the second portion, the delivery portion being hinged to the second portion for movement upwardly to provide an obstruction arresting final turning of the bale.

7. In a machine having means for discharging articles such as bales, the improvement comprising: a bale-handling unit having a receiving portion adjacent the discharge means, and a delivery portion stepped below the receiving portion, said portions being arranged in descending order to provide a chute-like arrangement effective to turn a bale end-over-end from the receiving portion to the delivery portion, the delivery portion being hinged for movement upwardly to provide an obstruction arresting final turning of the bale.

8. For a baler having a bale case provided with a generally horizontal floor leading to a bale-discharge end from which bales are discharged in such manner that the major axis of each bale is substantially horizontal: a bale case extension for connection to the discharge end of the bale case comprising a first bale-receiving portion positionable generally at the level of the bale case floor and as a continuation thereof for receiving a bale with its major axis as aforesaid and having an inner end proximate to and an outer end relatively remote from the bale case discharge end, a second bale-receiving portion at and stepped down from said outer end of the first portion a sufficient distance so that a bale moving off said outer end of the first portion will drop onto said second portion with its major axis upright; stop means on said second portion spaced outwardly from said outer end of the first portion and extending upwardly as an obstacle in the path of the upright bale to prevent the upright bale from tipping off said second portion in the direction of its discharge from the bale case; and means on said second portion separate from the stop means for causing the upright bale to be discharged from said second portion in a direction normal to the direction of discharge of the bale from the bale case.

9. For a baler having a bale case provided with a generally horizontal floor leading to a bale-discharge end from which bales are discharged in such manner that the major axis of each bale is substantially horizontal: a bale case extension for connection to the discharge end of the bale case comprising a first bale-receiving floor portion positionable generally at the level of the bale case floor and as a continuation thereof for receiving a bale with its major axis as aforesaid and having an inner end proximate to and an outer end relatively remote from the bale case discharge end, said outer end having a downwardly directed wall provided with a lower end, a second bale-receiving floor portion stepped down from said outer end of the first floor portion and joined to and extending outwardly from the lower end of said wall so that a bale moving off said outer end of the first floor portion will drop onto said second floor portion with its major axis upright; means including a wall on said second floor portion spaced outwardly from the aforesaid wall to prevent the upright bale from tipping off said second floor portion in the direction of its discharge from the bale case; and said second floor portion being inclined downwardly and transverse to the first floor portion for causing the upright bale to be discharged from said second floor portion in a direction transverse to the direction of discharge of the bale from the bale case.

10. For a baler including a mobile frame and a bale case on the frame having an outer end provided with a bale-discharge opening defined by a floor and spaced upright side walls elevated above the ground so that a bale emerging lengthwise from the bale case has its major axis horizontal: a bale case extension attachment having means for the mounting thereof on the discharge end of the bale case, comprising a plurality of members positionable at the discharge end of the bale case to define a bale-drop-off zone of generally rectangular shape as viewed from above and of such dimensions as to receive and relatively closely confine a bale having its major axis upright, one of said members being positionable to provide a fulcrum transverse to the length of the emerging bale so that the bale can by its own weight tip downwardly about such fulcrum to an upright position in said zone, another of said members being positioned transverse to the bale case to confine the bale against outward tipping beyond its upright position, and another of said members being arranged to cause tipping of the upright bale about one of the bottom corners of the bale in a direction at right angles to the first movement of the bale to its upright position.

11. For a baler having an elongated bale case of rectangular cross-section made up of side, top and floor portions terminating substantially in a vertical plane to define a discharge opening from which elongated bales formed in the bale case emerge by sliding lengthwise on their bottoms over the floor portion to ultimately clear the discharge end: a bale case extension for conducting each emerging bale to a discharge zone relatively remote from the bale case, comprising a rectangular plate-like element positionable horizontally at the level of the bale case floor portion as a continuation thereof and having one end proximate to the termination of the floor portion and another edge disposed in remote relation to the bale case and serving as a fulcrum for tilting emerged bales; means for connecting the element to the bale case so that an emerging bale slides on its bottom from the floor portion onto said element; the rectangularly related edges of the element defining immediately adjacent the discharge opening of the bale case an upper, bale-receiving area less than one-half the area of the bottom of the emerging bale so as to afford only temporary support to such bale and causing the bale, the instant it clears the bale case, to become unbalanced over said fulcrum edge and thus to roll directly off of said area; a second plate-like element adjoining said fulcrum edge and depending relatively sharply therefrom to enable the rolling bale to roll substantially directly downwardly; and said second element having a downwardly inclined portion positioned to encounter the rolling bale and causing the bale to roll still more remotely from the bale case.

12. For a baler including a mobile frame and a bale case on the frame having an outer end provided with a bale-discharge opening defined by a floor and spaced upright side walls elevated above the ground so that a bale emerging lengthwise from the bale case has its major axis horizontal: a bale case extension attachment having means for the mounting thereof on the discharge end of the bale case, comprising a side member positionable to project outwardly from the bale case substantially as an extension from one of the bale case side walls and at a level above that of the bale case floor, and having an outer terminal end spaced horizontally from the discharge opening a distance at least substantially equal to the length of a bale; end means adjoining the terminal end of the side member and extending generally normal to the side member and at such level as to be in line with the discharge opening; an extension floor member positionable at the discharge opening to extend outwardly substantially as a continuation of the bale case floor and terminating sharply in an outer terminal edge short of the end means by an amount substantially equal to the height of a bale emerging horizontally from the discharge opening, said terminal end of the extension floor member, the end means and that portion of the side member between the end means and said terminal end of the extension floor member defining a bale-drop-off opening so that a bale moving lengthwise outwardly over the floor member and guided by the side member will, when its outermost end reaches the end means, have less than half its weight supported by the extension floor member and consequently tip abruptly downwardly through an angle of substantially 90° about the terminal edge of the floor member as a fulcrum to an upright position within the aforesaid drop-off zone, said end means serving to prevent the bale from tipping outwardly beyond said upright position; and means on said attachment for tipping of the upright bale about one of the bottom corners of the bale in a direction at right angles to the first movement of the bale to its upright position.

13. In a mobile baler adapted to travel forwardly over a field and having a horizontal bale case disposed transverse to the line of travel and provided with an outer end spaced above the ground and through which elongated bales are discharged along a horizontal path lengthwise of the bale case with the major axes of such bales lying along such path, the improvement comprising: bale-handling means mounted at the outer end of the bale case and including a fulcrum transverse to the path of bale discharge and over which a bale moves and subsequently pivots through an angle of 90° to cause its outer end to drop by gravity so that the bale assumes a first position in which its major axis is upright and its outer end is lowermost and the front and rear corners of said lowermost outer ends are transverse to the line of travel, said means including a plurality of bale-engaging elements to temporarily retain the bale in said first position, one of said elements being spaced outwardly from the fulcrum a horizontal distance greater than the short dimension and less than the long dimension of the bale to serve as a stop for preventing the bale from pivoting through an angle materially in excess of the aforesaid 90° angle and one of said elements lying transverse to the line of travel and engaging the upright bale to cause the upright bale to tip parallel to the line of travel about one of its aforesaid transverse corners of its lowermost outer end to a second position in which its major axis is parallel to the line of travel.

MARCUS E. McCLELLAN.

References Cited in the file of this patent

UNITED STATES PATENTS

| Number | Name | Date |
| --- | --- | --- |
| 862,504 | Nofzinger | Aug. 6, 1907 |
| 876,291 | Blakeslee | Jan. 7, 1908 |
| 2,080,316 | Innes | May 11, 1937 |
| 2,318,229 | Jones | May 4, 1943 |
| 2,431,892 | Russell | Dec. 2, 1947 |
| 2,458,994 | Hill | Jan. 11, 1949 |
| 2,529,842 | Jones et al. | Nov. 14, 1950 |